Nov. 7, 1961     E. J. TISCHLER     3,007,672
ELECTROMAGNETICALLY OPERATED VALVE
Filed Dec. 21, 1960
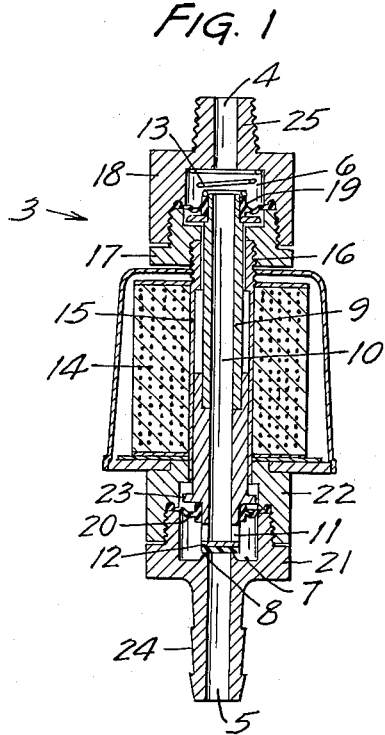
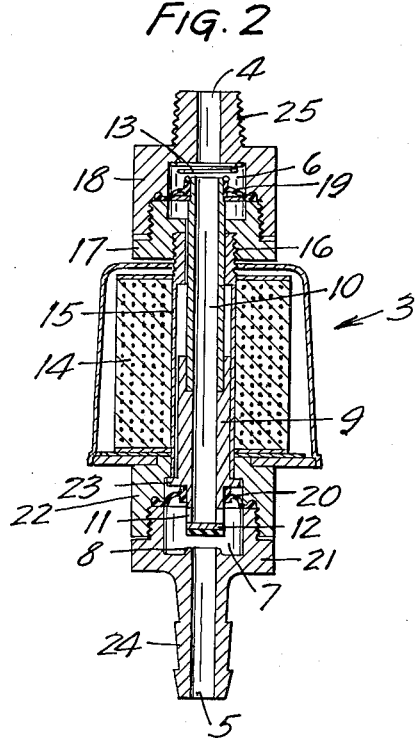
INVENTOR
EDWARD J. TISCHLER
BY
ATTORNEY United States Patent Office 3,007,672
Patented Nov. 7, 1961

3,007,672
ELECTROMAGNETICALLY OPERATED VALVE
Edward J. Tischler, St. Paul, Minn., assignor to Union Tank Car Company, Chicago, Ill., a corporation of New Jersey
Filed Dec. 21, 1960, Ser. No. 77,407
6 Claims. (Cl. 251—139)

This invention relates to an electromagnetically operated valve, and has for its principal object to provide a novel valve of this type which is particularly adapted for use where it is to be retained in an energized condition for considerable periods of time, or in situations where the fluid to be controlled contains solid particles or corrosive matter which should be excluded from the bearing surfaces for the plunger or armature to insure reliability of operation and long valve life.

A further object is to provide a valve of the class described having means for balancing the fluid pressure to which the valve closure member is subjected, whereby to minimize the power required to actuate the valve and to retain it in energized condition.

Other objects will appear and be more fully pointed out in the following specification and claims.

Referring to the accompanying drawing which illustrates, by way of example and not for the purpose of limitation, a preferred embodiment of my invention:

FIGURE 1 is a central vertical sectional view showing the valve in closed position, and FIG. 2 is a similar view showing the valve in open, energized condition.

An elongated housing, indicated generally by the numeral 3, is provided at one end with a port 4 and at the other end with a port 5. The port 4 communicates with a first chamber 6; the port 5 communicates with a second chamber 7, and an annular seat 8 surrounds the port 5 at its junction with a chamber 7. A tubular armature 9 extends from the chamber 6 to the chamber 7 and has an axial flow passage 10 for flow of fluid from one chamber to the other. As shown, lateral passages 11 connect chamber 7 with axial passage 10, and fixed on the lower end of the armature 9 is a closure member 12 adapted to be moved to and from closed position in relation to the seat 8. A resilient elastic washer may be fixed on the contact side of the closure member 12 for sealing engagement with the seat 8. In the embodiment shown, the tubular armature 9 and closure member 12 are biased toward valve closing position by a spring 13 which is confined between an upper end surface of the chamber 6 and an upper end portion of the armature. It will be evident that, as alternatives to the spring bias, the plunger or armature 9 may be arranged to close normally by gravity or by a fluid pressure differential acting on the closure member 12 or by both fluid pressure and gravity.

Surrounding the armature 9 between the chambers 6 and 7 is a magnetic coil 14 which, when energized, actuates the armature to open the closure member 12 in relation to the seat 8. An internal bearing member 15 of the coil 14 extends coaxially through the coil to slidably engage and guide the armature 9 in its axial movement. Bearing member 15 has a threaded upper end portion 16 upon which is fitted a threaded housing member 17 having external threads connecting it to an upper housing member 18. At its lower end the member 15 is rigidly connected to a housing member 22 defining an extension of the chamber 7. The tubular armature 9 is preferably made in two parts, one being formed from a ferrous or other magnetically attractable metal, and the other part (the upper part shown in the drawing) being formed from a non-magnetically attractable material such as brass or a synthetic resin.

Confined under compression between the upper end of the member 17 and a shoulder formed in the member 18 is the outer periphery of a sealing member 19. This sealing member is a flexible elastic diaphragm formed with a central opening which has a sealed connection with the upper end portion of the tubular armature 9 to allow limited axial movement of the armature while sealing off the upper end of the interface bearing surfaces between the armature and tubular coil member 15. A similar sealing member 20 of diaphragm form is provided to seal off the lower end of the bearing for the tubular armature from fluid flowing through the valve. The outer periphery of the member 20 is compressed between housing members 21 and 22 forming the chamber 7 and having a threaded connection one with the other. A central opening in the member 20 fits in sealing relation to a lower end portion of the tubular armature 9 above the ports 11. A suitable adhesive may be used to connect the inner peripheries of the sealing members 19 and 20 to the armature 9.

To limit movement of the armature, it is formed with an annular flange 23 above the sealing member 20 for contact with a shoulder formed in the housing member 22 when the valve is in energized open position, as indicated in FIG. 2. To facilitate assembly of the valve in a flow system, the housing member 21 may be formed with a projecting member 24 for connection with a tubular conduit and a threaded terminal 25 may be formed on the upper end of the housing member 18.

It will be evident that the sealing members 19 and 20 are so arranged that they are subject to oppositely directed fluid pressure in the chambers 6 and 7 respectively. In order to balance these oppositely directed fluid pressures acting on the armature, the area of the member 19 subject to fluid pressure in the chamber 6 may be made either smaller or larger than the area of the member 20 subject to pressure in the chamber 7. For example, in a situation where the port 5 is open to atmospheric pressure when the valve is in closed position and the chambers 6 and 7 contain fluid under superatmospheric pressure, the area of the pressure side of diaphragm 20 may be made enough larger than the pressure area of the diaphragm 19 to offset the pressure on the closure member 12 tending to retain it in closed position. With the valve pressure in balance, a minimum of power is required both to open the valve and to retain it in open position.

Another important function of the diaphragm seals at both ends of the bearing surfaces for the tubular armature is to seal off these surfaces and protect them against deposits of solid particles carried by the fluid passing through the valve, and also to protect the bearing from the deteriorative effect of corrosive matter in the fluid.

A further important feature of my improved valve is the provision for continuous cooling of the tubular armature and magnetic coil, particularly during periods when the coil is energized. It will be evident that this desirable cooling results from the flow from port 4, through chamber 6, axial passage 10 and lateral passages 11 past valve seat 8, to port 5, or in the reverse direction, to the port 4 from the port 5 throughout the period when the valve is in open energized position. When the valve is closed, fluid remains in the axial passage 10 and chambers 6 and 7 to continue the cooling effect. Valves possessing these advantageous features are needed, for example, for controlling flow in liquid treatment apparatus where the liquid contains sediment and corrosive salts or acids in solution and the solenoid coils are subject to the heating effect of energization for long periods of time.

I claim:

1. An electromagnetically operated valve comprising an elongated housing having oppositely disposed end chambers for fluid and ports communicating with said chambers respectively, a valve seat defined by one of said ports, an elongated tubular armature defining a flow passage from one of said chambers to the other, a valve closure member carried by said armature for closing the valve at said seat, a magnetic coil surrounding said armature and having a tubular bearing member disposed to guide said armature for axial movement within the coil, and sealing means interposed between the end portions respectively of said armature and said housing for excluding fluid under pressure in said chambers from the interface surfaces of the armature and tubular bearing member.

2. An electromagnetically operated valve in accordance with claim 1 in which said sealing means comprise flexible diaphragms interposed between the end portions of said tubular armature and said housing and subject to oppositely directed fluid pressure in said chambers respectively.

3. An electromagnetically operated valve in accordance with claim 1 in which each of said chambers is defined by separable, interconnected housing members adjacent to opposite ends respectively of said magnetic coil, and wherein opposite end portions of said tubular bearing member are rigidly connected to a housing member of one of said chambers.

4. An electromagnetically operated valve in accordance with claim 3 in which said sealing means comprise flexible diaphragms each having an outer periphery confined between the housing members defining one of said chambers and an inner periphery secured in sealing relation to an end portion of said tubular armature.

5. An electromagnetically operated valve comprising, a housing having oppositely disposed first and second chambers for fluid and ports communicating with said chambers respectively, a valve seat defined by one of said ports, an elongated tubular armature in continuous communication with both of said chambers, a valve closure member carried by said armature for closing contact with said seat, a magnetic coil surrounding said armature between said chambers and having a tubular bearing member containing said armature, said coil, when energized, being operative to actuate said closure member to open position in relation to said seat and said closure member being biased toward closed position on said seat, and sealing means interposed between said tubular armature and housing for excluding fluid from the interface surfaces of the armature and tubular bearing member.

6. An electromagnetically operated valve in accordance with claim 5 in which said sealing means comprise flexible diaphragms interposed between the end portions of said tubular armature and said housing and subject to oppositely directed fluid pressure in said chambers respectively.

References Cited in the file of this patent

UNITED STATES PATENTS

| | | |
|---|---|---|
| 1,651,865 | Blake | Dec. 6, 1927 |
| 2,922,614 | Nickells | Jan. 26, 1960 |